United States Patent [19]
Monajjem

[11] 3,817,003
[45] June 18, 1974

[54] HARMONIC COMPOSITE GRINDING OF TIRES

[75] Inventor: Freydoun Monajjem, Waco, Tex.

[73] Assignee: The General Tire and Rubber Company, Akron, Ohio

[22] Filed: Apr. 5, 1972

[21] Appl. No.: 241,246

[52] U.S. Cl.............. 51/281, 51/106 R, 51/165 R
[51] Int. Cl............................................. B24b 1/00
[58] Field of Search............ 451/281, 106 R, 165 R, 451/327

[56] References Cited
UNITED STATES PATENTS 3,553,903  1/1971  Christie..................... 51/106 R
3,574,973  4/1971  Rader........................ 51/165 R
3,724,137  4/1973  Hofelt....................... 51/106 R Primary Examiner—Harold D. Whitehead
Attorney, Agent, or Firm—Kemon, Palmer & Estabrook

[57] ABSTRACT

A method and apparatus for grinding tires to reduce the force reaction between the tire and load wheel to predetermined limits both as to the fundamental of the force reaction and a harmonic of the fundamental. Automatic switching from one to the other modes of grinding is provided.

4 Claims, 2 Drawing Figures

HARMONIC COMPOSITE GRINDING OF TIRES

BACKGROUND OF THE INVENTION

Tire grinding machines are known which automatically remove small amounts of rubber from the shoulders of the tire in response to automatically sensed variations in the force reaction between the tire and a load wheel. Examples of such machines may be found in at least the following U.S. Pat. Nos.:
3,553,903 dated Jan. 12, 1971
3,574,973 dated Apr. 13, 1971

As is well-known in this art, the grinding of tread shoulders of tires is an effective method for reduction of radial force variations which otherwise occur to an objectionable degree when uncorrected tires are used on automotive vehicles. At least at the present state of the art, the technology of manufacturing tires is incapable of producing a tire which is completely uniform. The variations which can occur in both material and assembly of material during the manufacturing process are also well known and need not be detailed here. Suffice to say, vehicle manufacturers now specify limits of force variations in tires which will be acceptable to them depending upon the tire size and the particular manufacturer. Some manufacturers place more emphasis on the limits of the fundamental force variation while others are more concerned with a harmonic of the fundamental force variation. In some cases higher harmonic values are allowed and vice-versa.

The problem of ultimately providing the best possible quality of ride is even more complex than mere variations in tire uniformity alone because these variations combine with such other factors as natural resonances of the wheel and suspension systems of the vehicle itself. In any event, it has been amply demonstrated that on the average, grinding of the shoulder portions of tires both as to the fundamental of force variations and as to a harmonic (usually the first) of the same force variation is effective to produce very substantial improvements in the riding qualities of the tires.

SUMMARY OF THE INVENTION

The present invention provides a programable system for increasing the capability of existing tire force grinding machines by incorporating programmed switching from grinding based upon the composite or actual force variation to grinding based on a harmonic of force variation.

DETAILED DESCRIPTION OF THE DRAWING

Figure 1:
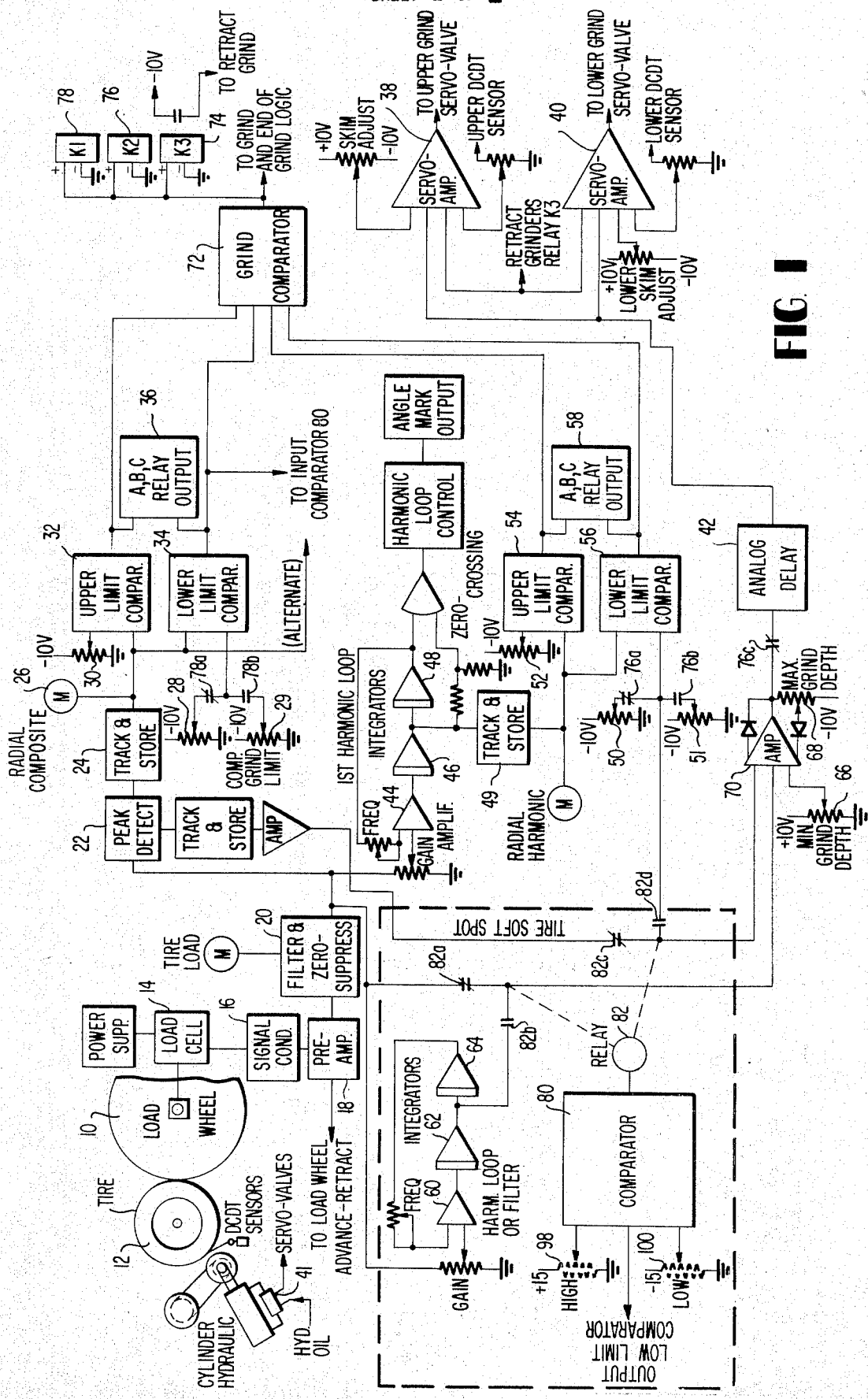
FIG. 1 is a schematic block diagram of a preferred embodiment of the present invention applied to a known tire grinder control arrangement.

A load wheel 10 is driven from a source of power not shown bringing the wheel in contact with and loading a tire 12 mounted in a special chuck so as to be freely rotatable by a power source not shown. The radial force variations between the tire and the load wheel are sensed by a load cell 14 to produce electrical signals which are an analog of the radial force variations. The signal is then fed to a signal conditioner 16, an amplifier 18 and a filter and zero suppressor 20. The peak to peak value is then detected in a peak detector 22 and then registered and stored in memory circuits 24 and may also be numerically displayed on a meter 26.

An acceptable lower limit of the value of the composite force variation is programmed into the system by the setting of a potentiometer 28. Similarly, another value representative of the maximum amount beyond which a tire may not be ground is programmed into the system through the setting of a potentiometer 30. The actual value of the radial composite force signal is then compared with the signals corresponding to the setting of potentiometers 28 and 30 by means of upper and ower limit comparator circuits 32 and 34. The outputs of the comparator circuits are utilized to drive a relay circuit 36 which is operative to energize various marking devices which will mark the tire, preferably in a coded designation, indicative of the value of its composite force variation.

The composite force variation signal as it appears at the input of the peak detector 22 is also fed to a pair of servo-amplifiers 38 and 40 the outputs of which control servo-valves one of which is schematically indicated at 41. The servo-valves control movement of the grinding members into and out of contact with the shoulders of the tire. Since the grinding wheels are displaced circumferentially of the tire from the point of engagement of the tire with the load wheel 10, this circumferential spacing must be taken into consideration in order that the actual grinding will remove rubber at the desired location on the tire. The composite force variation signal therefor, before reaching the servo amplifiers 38 and 40, is fed through an analog delay circuit 42 which exactly compensates for the time that it takes that portion of the tire which has created a composite force variation signal sensed by the load cell 14 to travel from the point of contact with the load wheel 10 to the location of the grinding wheels.

In accordance with the present invention, the composite force variation signal as it appears at the input of the peak detector circuit 22 is also fed to a harmonic loop arrangement including an amplifier 44 and a pair of integrators 46 and 48. The output of integrator 46 will be an analog signal proportional to a harmonic of the radial composite force variation signal fed into the amplifier 44. While this could be any harmonic, for the purposes of this disclosure it will be referred to as the first harmonic. In any event, the signal is fed to a register and storage means 49 similar to the storage means 24 used to store the composite radial force signal. Just as in the case of the composite force signal, an acceptable value of the first harmonic of the composite force signal is programmed into the system by setting a potentiometer 50 and likewise a signal corresponding to the maximum amount beyond which the tire may not be ground is programmed into the system by the setting of a potentiometer 52. The actual value of the first harmonic signal is then compared in upper and lower limit comparator circuits 54 and 56 the outputs of which are utilized to drive a realy circuit 58 which will energize various marking devices to mark the tire with a code indicative of the value of the first harmonic of the composite force variation.

The signal corresponding to the composite radial force variation which appears at the input of the peak detector 22 is also fed to a first harmonic loop which includes an inverting amplifier 60 and integrators 62 and 64. Under the conditions to be hereinafter described, the signal appearing at the output of the integrator 62, which is the first harmonic component of the composite force variation, is arranged to be fed to the servo-amplifiers 38 and 40 in the same manner as the composite force variation signal in order that the tire may be ground in accordance with the first harmonic signal.

Irrespective of which of the two signals is being used at the time to control the servo-amplifiers 38 and 40, two potentiometers 66 and 68 associated with the amplifier 70 which drives the servo-amplifiers 38 and 40 through the analog delay 42 are used to program the minimum grind level and the maximum grind depth respectively.

The output of the comparator circuits 32, 34, 54 and 56 are all continuously monitored by a grind comparator circuit 72. When grinding in accordance with either the composite radial force signal or the harmonic signal has proceeded to a point where the variations are within the pre-programmed acceptable limits, a relay 74 is energized to close a normally open circuit which will retract the grinders from the tire. Relays 76 and 78 are also subject to control by the grind comparator 72 and are effective when energized to open the circuits to potentiometers 50 and 28 respectively and substitute for these potentiometers other potentiometers 29 and 51. This permits grinding the tire to values which are below the original set lower limits established by the setting of potentiometers 28 and 50.

In order to control automatically a switch-over from the radial composite force signal to the first hamonic of that signal as an input to the grind servo-amplifiers 38 and 40, the output of the lower limit comparator 34 is fed to the input of a further comparator circuit 80. This circuit controls a relay 82 which controls contacts 82a, 82b, 82c and 82d in such manner as to reverse their conditions when the relay 82 is energized. In its unenergized state therefor the composite force variation signal is fed to the servo-amplifiers through the normally closed contact 82a. Whenever the relay 82 is energized however contacts 82a are opened and contacts 82b are closed thereby establishing an input to the amplifier 70 the analog delay 42 and the servo-grind amplifiers 38 and 40 from the output of integrator 62 which is the first harmonic of the composite radial force variation signal.

Figure 2:
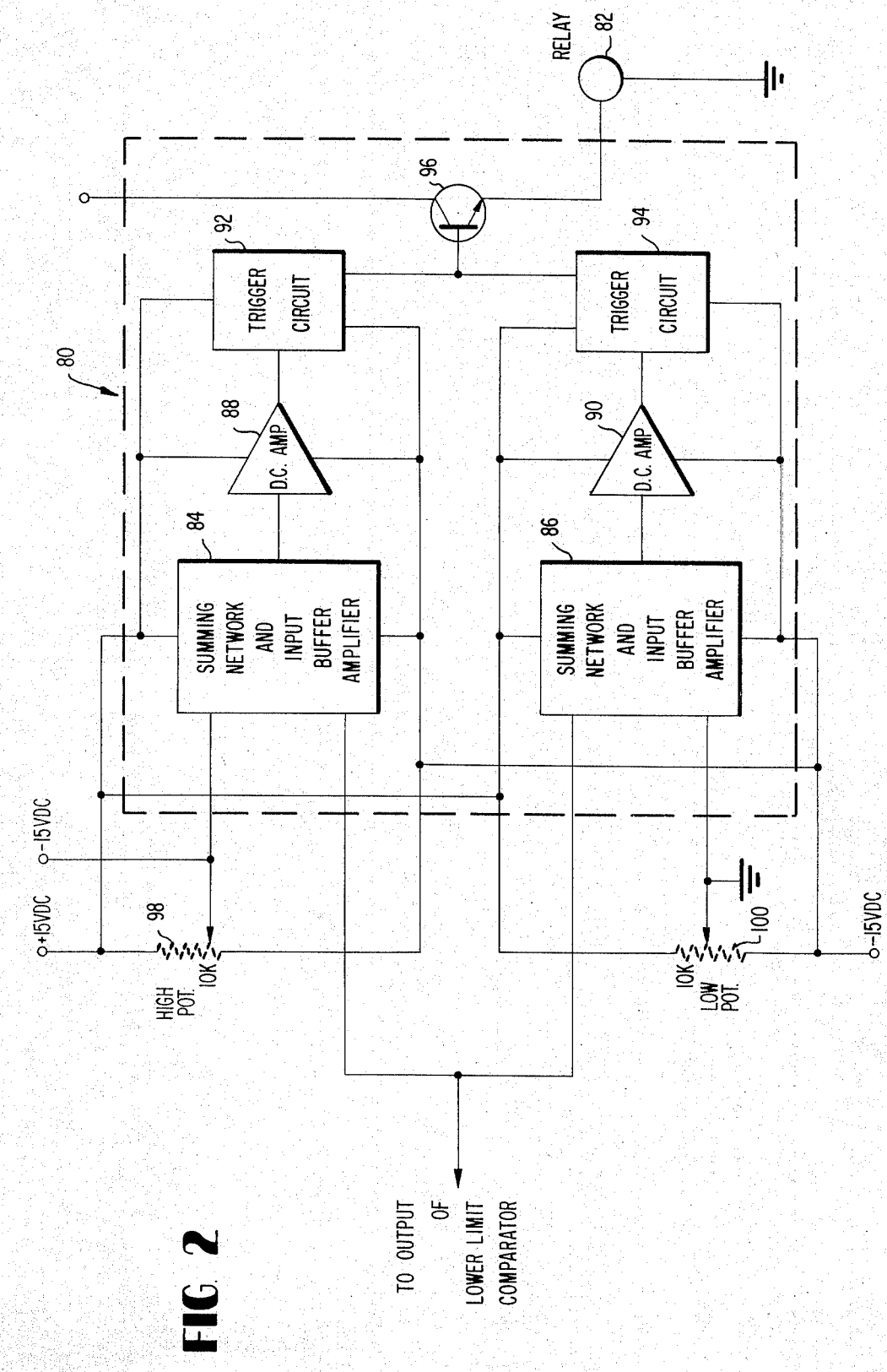
FIG. 2 is an amplified block diagram of the comparator 80 of FIG. 1.

Referring now to FIG. 2 which is a schematic block diagram of the components of the comparator circuit 80, this circuit includes a pair of summing network and input buffer amplifiers 84 and 86 which drive a pair of DC amplifiers 88 and 90 respectively. The outputs of the DC amplifiers are in turn fed to a pair of trigger circuits 92 and 94 the combined outputs of which drives the relay 82 through a transistor 96.

On the input side of the comparator circuit 80, are arranged a pair of potentiometers 98 and 100. The setting of these potentiometers provides a programmed analog signal which is compared with the output of the lower limit comparator 34. When the latter signal reaches a value corresponding to the setting of the potentiometers, the relay 82 is energized to connect the output of integrator 62 to the grind servos 38 and 40 by opening 82a and closing 82b. Contacts 82c and 82d are used to switch the soft spot signal of composite force into the grind amplifier 70 when the tire is to be ground on composite response or to a negative fixed value when the tire is to be ground on a harmonic response.

From the foregoing it will be apparent to those skilled in this art that there is herein disclosed a new and useful system for controlling tire grinding machines which is effective to grind within predetermined limits based on the composite radial force variations and then automatically to switch to a first harmonic of the composite radial force signal and to again grind the tire to within predetermined limits based on the harmonic signal. The order of grinding of course can be reversed if desired.

While a preferred embodiment of the invention has been herein shown and described, applicant claims the benefit of a full range of equivalents within the scope of the appended claims.

I claim:

1. A method of achieving uniformity of automobile tire characteristics comprising:
   rotating a tire in contact with a load wheel;
   determining the composite force reaction between said tire and said load wheel;
   grinding the shoulders of said tire until said composite force reaction lies within predetermined limits;

determining a harmonic of said composite force reaction between said tire and said load wheel; and
   further grinding the shoulders of the tire until said harmonic of said composite force reaction lies between predetermined limits.

2. A method as defined by claim 1 in which the tire is first ground to said prdetermined limits of said composite force reaction.

3. A method as defined by claim 1 in which the tire is first ground to predetermined limits of said harmonic of said composite force reaction.

4. A method as defined by claim 1 in which said harmonic is the first harmonic of said composite force reaction.

* * * * *